F. J. BALL.
REVERSING MECHANISM.
APPLICATION FILED JAN. 31, 1908.

936,694.

Patented Oct. 12, 1909.
2 SHEETS—SHEET 1.

Witnesses:—
F. George Barry.
Henry Thieme.

Inventor:—
Frederic J. Ball
by attorneys

F. J. BALL.
REVERSING MECHANISM.
APPLICATION FILED JAN. 31, 1908.
936,694.
Patented Oct. 12, 1909.
2 SHEETS—SHEET 2.
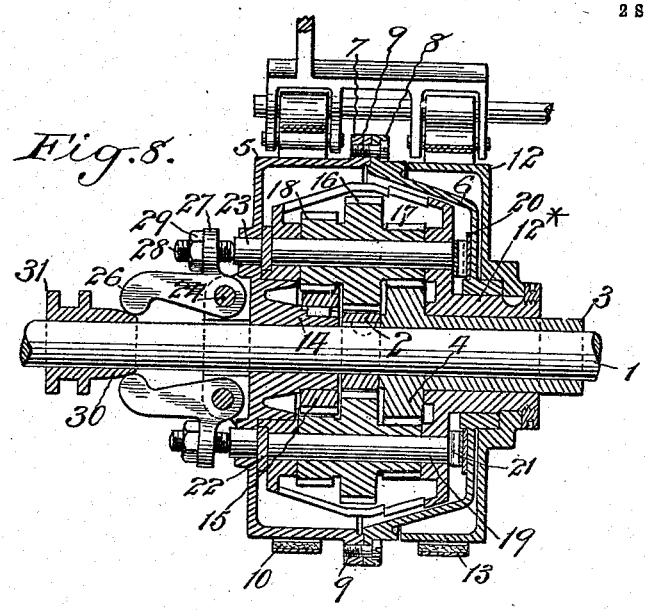
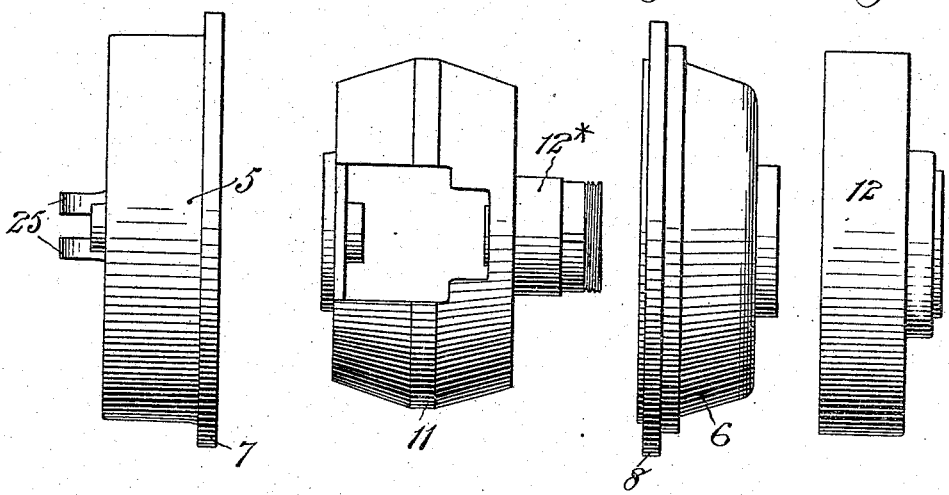

UNITED STATES PATENT OFFICE.

FREDERIC J. BALL, OF NEW YORK, N. Y., ASSIGNOR TO NEW YORK GEAR WORKS, OF BROOKLYN, NEW YORK, A COPARTNERSHIP.

REVERSING MECHANISM.

936,694.  Specification of Letters Patent.  Patented Oct. 12, 1909.

Application filed January 31, 1908. Serial No. 413,560.

*To all whom it may concern:*

Be it known that I, FREDERIC J. BALL, a citizen of the United States, and resident of the borough of Brooklyn, in the city and State of New York, have invented a new and useful Improvement in Reversing Mechanism, of which the following is a specification.

My invention relates to an improvement in reversing mechanism and has for its object to provide certain new and useful improvements in the construction, form and arrangement of the several parts whereby a very simple and effective mechanism is provided in which the constant rotary movement of a driving shaft in one direction is caused to impart a rotary movement to a power transmitting shaft at varying speeds in the same direction or at a predetermined speed in a reverse direction at pleasure with a minimum amount of friction.

A further object is to provide a reversing mechanism comprising a rotary driving shaft, a power transmitting shaft, a pair of drums, a train of gearing connecting the drums and shafts, brakes for holding the one or the other of said drums stationary or releasing both drums and means for clutching the two drums together when released from their brakes.

A practical embodiment of my invention is represented in the accompanying drawings in which—

Figure 1:
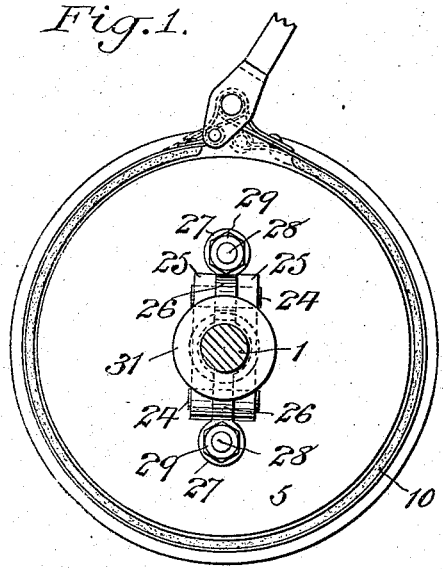
Figure 2:
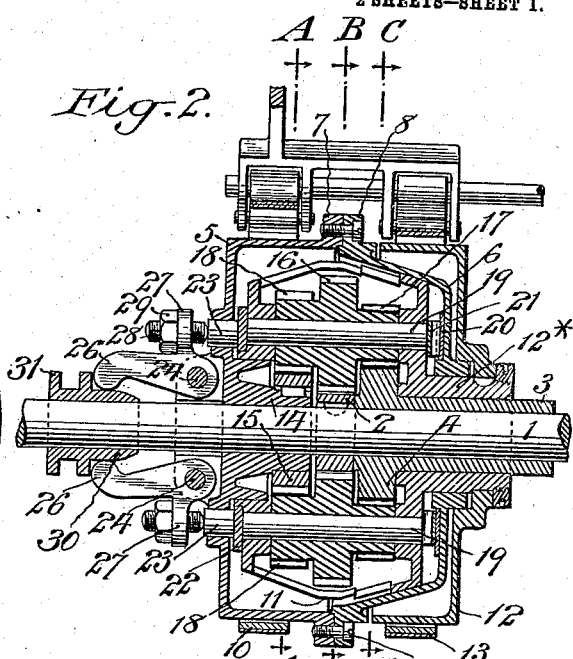
Figure 3:
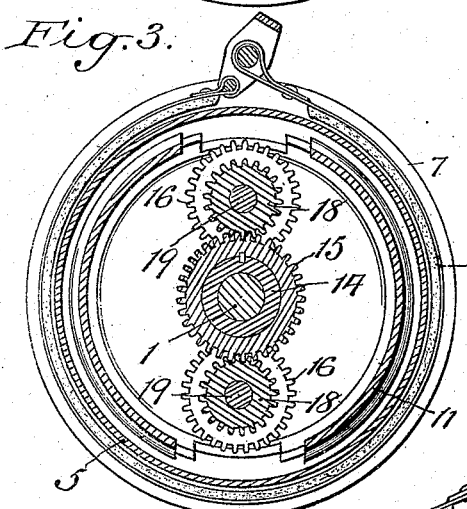
Figure 4:
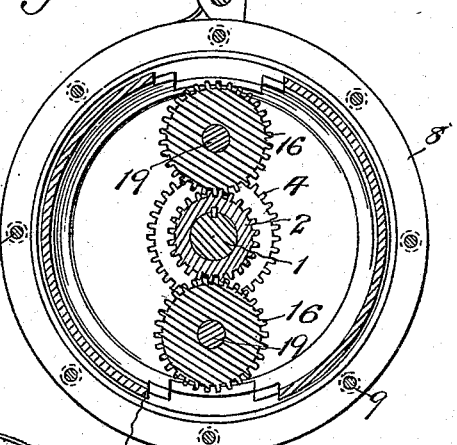
Figure 6:
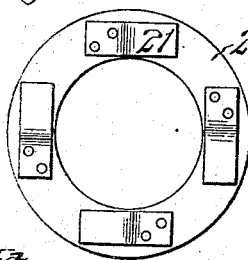
Figure 5:
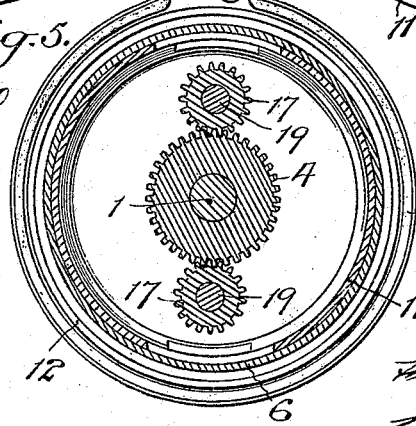
Figure 7:

Figure 1 is an end view of my improved reversing mechanism with the parts in the positions which they assume when both brakes are released and the two drums are clutched together for locking the driving shaft to the power transmitting shaft, Fig. 2 is a longitudinal central section through the same, Fig. 3 is a transverse section taken in the plane of the line A—A of Fig. 2, looking in the direction of the arrows, Fig. 4 is a transverse section taken in the plane of the line B—B of Fig. 2, looking in the direction of the arrows, Fig. 5 is a transverse section taken in the plane of the line C—C of Fig. 2, looking in the direction of the arrows, Fig. 6 is a face view of one of the slip rings with the springs tending to force the two drums apart, Fig. 7 is an edge view of the same, Fig. 8 is a longitudinal central section through the reversing mechanism with the parts in the positions which they assume when both brakes are released and the two drums are disengaged, Fig. 9 is a detail side view of one member of one drum, Fig. 10 is a similar view of one member of the other drum, Fig. 11 is a similar view of the other member of the first named drum, and Fig. 12 is a similar view of the other member of the second named drum.

1 designates the rotary driving shaft which may be driven from any suitable source of power, not shown herein. This driving shaft is shown as provided with a spur gear 2. The power transmitting shaft is denoted by 3 and it is provided with a spur gear 4. This power transmitting shaft is herein shown as loosely mounted on the driving shaft with its gear 4 adjacent to the driving shaft gear 2.

One of the drums comprises two members 5 and 6, which are provided with exterior circumferential flanges 7, 8, arranged to be secured together by suitable screws 9. The side wall of the member 5 is cylindrical so as to present a proper braking surface for the brake band 10 of a band brake of well known or approved form. The side wall of the member 6 of the said drum is tapered so as to present a conical clutching surface. The side wall of the member 11 of the other drum is tapered so as to present a conical clutching surface arranged to be engaged with and disengaged from the conical clutching surface in the member 6 of the first named drum. This member 11 is provided with a hub 12* projecting centrally through the member 6 of the first named drum, to which hub is secured the second member 12 of the second named drum. The side wall of the member 12 is cylindrical so as to present the proper braking surface for the brake band 13 of a band brake of any well known or approved form.

The drum member 5 of the first named drum has a central hub 14 which is provided with a spur gear 15 located adjacent to the driving shaft gear 2.

Three spur gears 16, 17, 18, are mounted to rotate together on a stud axle 19, which stud axle is supported in the end walls of the drum member 11. The gear 16 meshes with the driving shaft gear 2, the gear 17 meshes with the power transmitting shaft gear 4 and the gear 18 meshes with the gear 15 on the hub 14 of the drum member 5.

In the accompanying drawings, I have shown two sets of these gears 16, 17, 18, arranged diametrically opposite each other but one or more sets may be used as found desirable.

Means are provided for normally holding the conical surfaces of the drum members 11 and 6 apart, which means are herein shown as comprising a ring 20 frictionally engaging the end wall of the drum member 6 and a plurality of springs 21 secured to said ring and frictionally engaging the adjacent end wall of the drum member 11. The means which I have shown for clutching the conical surfaces of the members 11 and 6 of the two drums are constructed, arranged and operated as follows. A ring 22 is located between the end wall of the drum member 5 and the end wall of the drum member 11 adjacent thereto. A plurality of loose pins 23 are mounted in the end of the drum member 5 with their inner ends in engagement with the ring 22 and their outer ends exposed. Each one of a plurality of dogs is pivoted at 24 between two lugs 25 on the end of the drum member 5. Each dog is provided with a long arm 26 and a short arm 27. The short arm is provided with an adjustable screw 28 arranged to engage the exposed end of one of the sliding pins. A lock nut 29 is provided for securing the screw 28 in the proper adjustment. The long arm 26 of the dog is arranged to be swung outwardly by engagement with the beveled end 30 of a clutch slide 31 loosely mounted on the driving shaft 1.

In operation, if it be desired to drive the power transmitting shaft 3 in the same direction and at the same speed as the driving shaft 1, the brake bands 10 and 13 are released. The clutch slide 31 is then moved into position to rock the dogs 26, 27, in a direction to cause the dogs to clutch the members 11 and 6 of the two drums together. When in this position, the drums and shafts all rotate together. When it is desired to drive the power transmitting shaft in the same direction as the driving shaft but at a lower speed, the two drums are separated by the withdrawal of the clutch slide 31. The band brake is then swung in a direction to cause its brake band 13 to grip the drum member 12 and hold it against movement. When it is desired to drive the power transmitting shaft in the reverse direction to the driving shaft, the band brake is swung in a direction to release the brake band 13 from its drum member 12 and tighten the brake band 10 on its drum member 5, thus holding the drum 5, 6, stationary.

The side wall of the drum member 11 is cut away as shown clearly in Fig. 10 to permit the ready insertion of the gears 16, 17, 18. The stud axle 19 may be readily inserted through the gears and the end walls of the drum member 11 for mounting the gears in position within said drum member.

What I claim is:

1. A reversing mechanism comprising a driving shaft, a power transmitting shaft, two drums each comprising a cylindrical and a conical member, the cylindrical and conical members of one drum completely inclosing the conical member of the other drum, gears connecting the shafts and drums, a brake for the cylindrical member of each drum and means for clutching the conical members of the two drums together.

2. A reversing mechanism comprising a driving shaft, a power transmitting shaft, two drums each comprising a cylindrical and a conical member, the cylindrical and conical members of one drum completely inclosing the conical member of the other drum, gears connecting the shafts and drums, a brake for the cylindrical member of each drum, means for clutching the conical members of the two drums together, and means for yieldingly holding them apart.

3. A reversing mechanism comprising a driving shaft, a power transmitting shaft, two drums, each comprising a cylindrical and a conical member, the cylinder and conical members of one drum completely inclosing the conical member of the other drum, gears connecting the shafts and drums, a brake for the cylindrical member of each drum, means for clutching the conical members of the two drums together, and means interposed between the end walls of the cone members of both drums for yieldingly holding the drums apart.

4. A reversing mechanism comprising a driving shaft, a power transmitting shaft, two drums, each comprising a cylindrical and a conical member, the cylinder and conical members of one drum inclosing the conical member of the other drum, gears connecting the shafts and drums, a brake for the cylindrical member of each drum, means for clutching the conical members of the two drums together, comprising loose pins mounted in one of the drums arranged to engage the other drum, and means for operating the pins.

5. A reversing mechanism comprising a driving shaft, a power transmitting shaft, two drums, each comprising a cylindrical and a conical member, the cylinder and conical members of one drum inclosing the conical member of the other drum, gears connecting the shafts and drums, a brake for the cylindrical member of each drum, means for clutching the conical members of the two drums together, comprising a ring located between the drums, loose pins mounted in one of the drums arranged to press the ring against the other drum, and means for operating the pins.

6. A reversing mechanism comprising a driving shaft, a power transmitting shaft, two drums, each comprising a cylindrical and a conical member, the cylindrical and conical members of one drum inclosing the conical member of the other drum, gears connecting the shafts and drums, a brake for the cylindrical member of each drum, means for clutching the conical members of the two drums together comprising loose pins mounted in one of the drums arranged to engage the other drum and means for operating the pins, and means interposed between the end walls of the cone members of both drums for yieldingly holding the drums apart.

7. A reversing mechanism comprising a driving shaft, a power transmitting shaft, two drums each comprising a cylindrical and a conical member, the cylindrical and conical members of one drum inclosing the conical member of the other drum, gears connecting the shafts and drums, a brake for the cylindrical member of each drum, means for clutching the conical members of the two drums together comprising a ring located between the drums, loose pins mounted in one of the drums arranged to press the ring against the other drum and means for operating the pins, and means interposed between the end walls of the cone members of both drums for yieldingly holding the drums apart.

In testimony, that I claim the foregoing as my invention, I have signed my name in presence of two witnesses, this twenty ninth day of January 1908.

FREDERIC J. BALL.

Witnesses:
F. GEORGE BARRY,
HENRY THIEME.